US008649961B2

(12) United States Patent
Hawkins et al.

(10) Patent No.: US 8,649,961 B2
(45) Date of Patent: Feb. 11, 2014

(54) METHOD OF DIAGNOSING SEVERAL SYSTEMS AND COMPONENTS BY CYCLING THE EGR VALVE

(75) Inventors: Jeffery Scott Hawkins, Farmington Hills, MI (US); Marc Christian Allain, Plymouth, MI (US); Justin R. Kollien, Commerce Township, MI (US)

(73) Assignee: Detroit Diesel Corporation, Detroit, MI (US)

( * ) Notice: Subject to any disclaimer, the term of this patent is extended or adjusted under 35 U.S.C. 154(b) by 165 days.

(21) Appl. No.: 13/236,882

(22) Filed: Sep. 20, 2011

(65) Prior Publication Data

US 2013/0068203 A1    Mar. 21, 2013

(51) Int. Cl.
*G01M 15/10*    (2006.01)

(52) U.S. Cl.
USPC ... 701/114; 701/108; 73/114.74; 123/568.16; 123/568.21

(58) Field of Classification Search
USPC .................... 123/568.16, 568.21; 73/114.74; 701/108, 114
See application file for complete search history.

(56) References Cited

U.S. PATENT DOCUMENTS

| | | | | |
|---|---|---|---|---|
| 5,513,616 | A * | 5/1996 | Matsumoto et al. | 123/568.16 |
| 5,621,167 | A * | 4/1997 | Fang-Cheng | 73/114.74 |
| 6,687,601 | B2 * | 2/2004 | Bale et al. | 701/108 |
| 6,848,418 | B1 * | 2/2005 | Summers et al. | 123/339.11 |
| 7,066,160 | B2 * | 6/2006 | Matsumoto | 123/568.16 |
| 7,778,766 | B1 * | 8/2010 | Cowgill et al. | 701/108 |
| 8,201,442 | B2 * | 6/2012 | Osburn et al. | 73/114.74 |
| 8,453,431 | B2 * | 6/2013 | Wang et al. | 60/285 |
| 2003/0225503 | A1 * | 12/2003 | Mazur | 701/108 |
| 2007/0272211 | A1 * | 11/2007 | Kassner | 123/435 |
| 2011/0184632 | A1 * | 7/2011 | Kang et al. | 701/109 |

* cited by examiner

*Primary Examiner* — Erick Solis
(74) *Attorney, Agent, or Firm* — Bill C. Panagos; Linda D. Kennedy; Butzel Long

(57) ABSTRACT

A method to operate an electronic controlled internal combustion engine to perform on board NOx emissions level diagnostics. In one embodiment, the method may include operating the engine to maintain a predetermined temperature for a predetermined period of time, determining whether the engine operating status is stable for one of cruise control, idle engine speed, engine torque, or high idle regeneration for a predetermined period of time, cycling the EGR valve between a first position for a predetermined period of time and then in a second position for a predetermined period of time, a determining a change in engine out NOx levels to determine whether an engine component or system is malfunctioning.

23 Claims, 3 Drawing Sheets

METHOD OF DIAGNOSING SEVERAL SYSTEMS AND COMPONENTS BY CYCLING THE EGR VALVE

TECHNICAL FIELD

On highway vehicles powered by heavy duty diesel engines are subject a variety of on board diagnostic requirements from various governmental agencies, including the California Air Resource Board Heavy Duty On Board Diagnostic regulation "Title 13, California Code Regulations, Section 1971.1 On-Board Diagnostic System Requirements for 2010 and Subsequent Model Year Heavy Duty Engines (HD OBD)", Euro IV, V and eventual Euro VI requirements. The United States Environmental Protection Agency is also expected to adopt similar requirements for on board diagnostics. As stated in the California Air Resource Board HDOBD regulation, "The purpose of the California Air Resource Board HDOBD regulation is to establish emission standard and other requirements for onboard diagnostics systems (OBD systems) that re installed on 2010 and subsequent model year engines certified for sale in heavy duty applications in California. The OBD systems, through the use of an onboard computer(s) shall monitor emissions systems in use for the actual life of the engine and shall be capable of detecting malfunctions of the monitored emission systems, illuminating a malfunction indicator light (MIL) to notify the vehicle operator of detected malfunctions, and storing fault codes identifying the detected malfunctions.

These regulations require new methods of monitoring all of the various systems that impact emissions to verify their functionality. Additionally, diagnosis is also required at the component level.

BRIEF SUMMARY

An intrusive diagnostic monitor is defined as a monitor that overrides normal control functionality momentarily in order to diagnose one or more systems or components. In one embodiment, the present disclosure is directed to a method to conduct an intrusive test in which the EGR valve in an internal combustion engine is moved to the fully open and then the fully closed position. The method can be conducted in either order, i.e., it is immaterial whether the EGR valve is closed or opened first. When the intrusive check is used to diagnose exhaust aftertreatment sensors, the valve cycling (open/close) may be conducted at a high enough engine speed/load condition for the exhaust gas sensors, i.e., NOx sensors, to be able to accurately measure the NOx emissions and detect the change based on the EGR valve position change. The actual levels will vary depending on the engine.

According the present disclosure, it is possible to use NOx sensor input as part of a determination of system of component malfunctions, as well as overall systems within the exhaust system. By measuring NOx levels, it is possible to determine the functionality of NOx sensors, NOx conversion efficiency of the exhaust system, NOx reductant injection performance, NOx reductant level, whether EGR system response is satisfactory, and the EGR low flow/high flow rates.

In addition, it is possible to determine the status of the many other components e.g. On Board Diagnostic Comprehensive Components, such as, but not limited to: EGR valve command, EGR valve position by determining the actual EGR valve position versus the commanded EGR valve position; the EGR change of pressure (ΔPressure) sensor; EGR inlet pressure, EGR outlet pressure, NOx Engine Out sensor, NOx tail pipe out sensor, and the reductant injector.

In one non-limiting embodiment, the disclosure is directed to a controller configuration and a method to operate an electronic controlled internal combustion engine and perform On Board Diagnostics (OBD). In one non limiting embodiment, the method may comprise the steps of operating an engine to maintain a predetermined temperature for a predetermined period of time; determining whether the engine operating status is stable for at least one of cruise control, idle engine speed (RPM), engine torque (ETQ) or high idle regeneration for a predetermined period of time; cycling the EGR valve between an open position for a first predetermined period of time and a closed position for a second predetermined period of time; and determining a change in the engine out NOx to determine whether an engine component or system is malfunctioning.

In another non limiting embodiment, the method may further include operating the engine until the status of at least one of cruise control, idle, engine speed (RPM), engine torque (ETQ) or high idle regeneration is stable for a predetermined period of time, at which time it may be determined that the engine operating status for at least one of a remainder of cruise control, idle engine speed, engine torque or high idle regeneration is not stable.

In another embodiment, the method may include cycling the EGR valve to a fully open position for a predetermined period of time and then to a fully closed position for a predetermined period of time.

In another embodiment, the method may include cycling the EGR valve to a fully closed position for a predetermined period of time to a fully open position for a predetermined period of time.

In another embodiment, the cycling of the EGR valve may be done at an engine speed or engine load condition sufficient to measure the change of NOx (ΔNOx) emissions based on the EGR valve position.

It has been discovered that engine out NOx level and exhaust out NOx levels change relative to EGR valve position. Engine out NOx and exhaust out NOx increase when the EGR valve is open and decrease when the EGR valve is closed. If engine out NOx and exhaust out NOx differ by a predetermined amount within a predetermined period of time it is an indication the NOx sensors, NOx conversion efficiency, NOx reductant injection performance, NOx reductant level, EGR response, EGR low flow/high flow, EGR valve command, EGR valve position, EGR change of pressure sensor, engine manifold temperatures, and reductant system are within operating specification. The method may also be useful in determining whether NOx emissions exceed a predetermined level, at which determination it is possible to override the EGR control.

A more thorough discussion of the methods for diagnosing engine systems and components may be understood by reference to following detailed description, the drawings, and the claims.

DETAILED DESCRIPTION OF THE INVENTION

Figure 1:
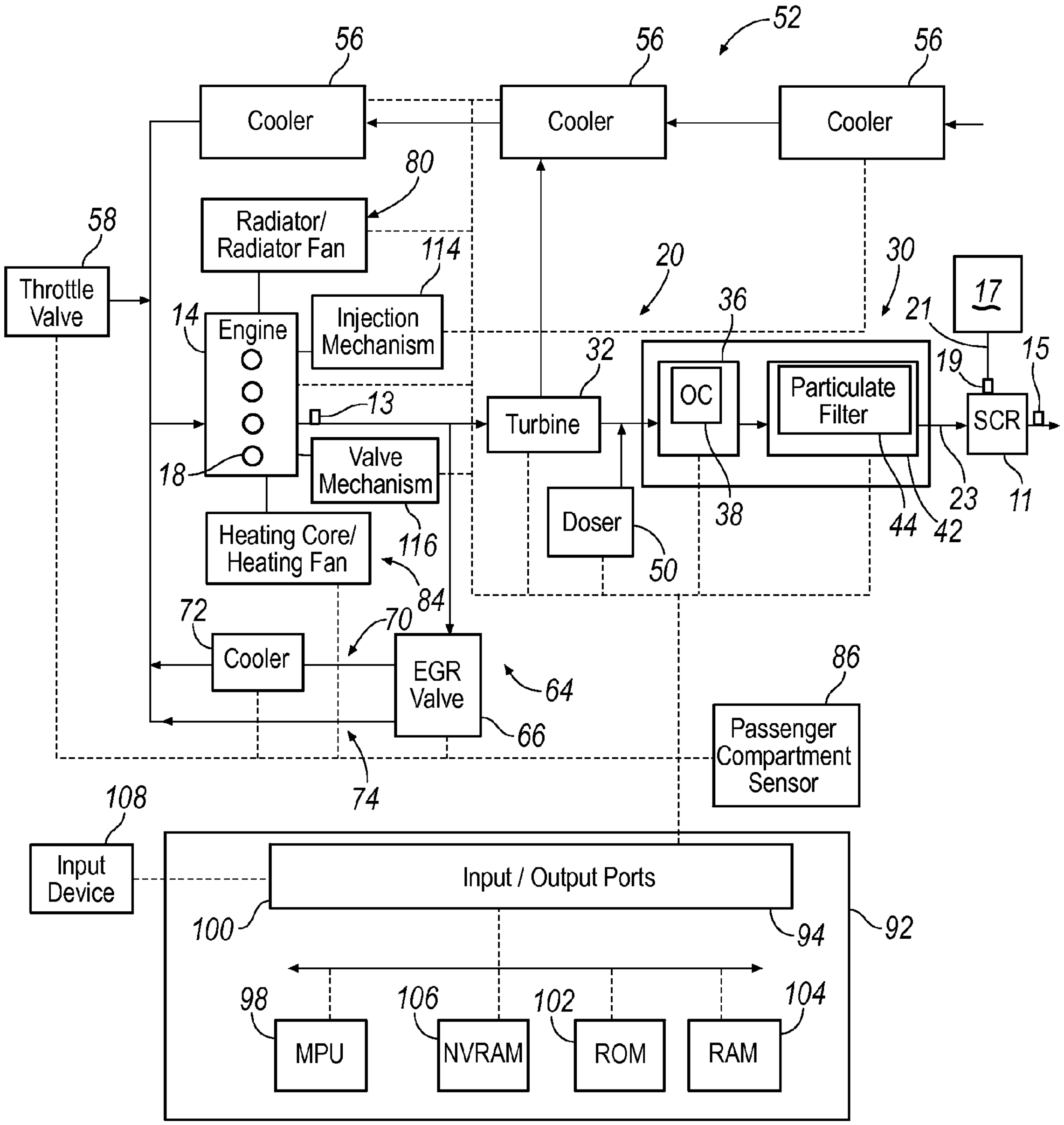
FIG. 1 is a schematic representation of an internal combustion engine system and an electronic controller.

FIG. 1 illustrates a schematic representation of an internal combustion engine system 10 in accordance with one non-limiting aspect of the present invention. The system 10 may provide power for driving any number of vehicles, including on-highway trucks, construction equipment, marine vessels, stationary generators, automobiles, trucks, tractor-trailers, boats, recreational vehicle, light and heavy-duty work vehicles, and the like.

The system 10 may be referred to as an internal combustion drive system wherein fuels, such as gasoline and diesel fuels, are burned in a combustion process to provide power, such as with a spark or compression ignition engine 14. The engine 14 may be a diesel engine that includes a number of cylinders 18 into which fuel and air are injected for ignition as one skilled in the art will appreciate. The engine 14 may be a multi-cylinder compression ignition internal combustion engine, such as a 4, 6, 8, 12, 16, or 24 cylinder diesel engines, for example. It should be noted, however, that the present invention is not limited to a particular type of engine or fuel.

Exhaust gases generated by the engine 14 during combustion may be emitted through an exhaust system 20. The exhaust system 20 may include any number of features, including an exhaust manifold and passageways to deliver the emitted exhaust gases to a particulate filter assembly 30, which in the case of diesel engines is commonly referred to as a diesel particulate filter. Optionally, the system 20 may include a turbocharger proximate the exhaust manifold for compressing fresh air delivery into the engine 14. The turbocharger, for example, may include a turbine 32 and a compressor 34, such as a variable geometry turbocharger (VGT) and/or a turbo compound power turbine. Of course, the present invention is not limited to exhaust systems having turbochargers or the like.

The particulate filter assembly 30 may be configured to capture particulates associated with the combustion process. In more detail, the particulate filter assembly 30 may include an oxidation catalyst (OC) canister 36, which in includes an OC 38, and a particulate filter canister 42, which includes a particulate filter 44. The canisters 36, 42 may be separate components joined together with a clamp or other feature such that the canisters 36, 42 may be separated for servicing and other operations. Of course, the present invention is not intended to be limited to this exemplary configuration for the particulate filter assembly 30. Rather, the present invention contemplates the particulate filter assembly including more or less of these components and features. In particular, the present invention contemplates the particulate filter assembly 30 including only the particulate filter 44 and not necessarily the OC canister 36 or substrate 38 and that the particulate filter 44 may be located in other portions of the exhaust system 20, such as upstream of the turbine 32.

The OC 38, which for diesel engines is commonly referred to as a diesel oxidation catalyst, may oxidize hydrocarbons and carbon monoxide included within the exhaust gases so as to increase temperatures at the particulate filter 44. The particulate filter 44 may capture particulates included within the exhaust gases, such as carbon, oil particles, ash, and the like, and regenerate the captured particulates if temperatures associated therewith are sufficiently high. In accordance with one non-limiting aspect of the present invention, one object of the particulate filter assembly 30 is to capture harmful carbonaceous particles included in the exhaust gases and to store these contaminates until temperatures at the particulate filter 44 favor oxidation of the captured particulates into a gas that can be discharged to the atmosphere.

The OC and particulate filter canisters 36, 42 may include inlets and outlets having defined cross-sectional areas with expansive portions there between to store the OC 38 and particulate filter 44, respectively. However, the present invention contemplates that the canisters 36, 42 and devices therein may include any number configurations and arrangements for oxidizing emissions and capturing particulates. As such, the present invention is not intended to be limited to any particular configuration for the particulate filter assembly 30.

To facilitate oxidizing the capture particulates, a doser 50 may be included to introduce fuel to the exhaust gases such that the fuel reacts with the OC 38 and combusts to increase temperatures at the particulate filter 44, such as to facilitate regeneration. For example, one non-limiting aspect of the present invention contemplates controlling the amount of fuel injected from the doser as a function of temperatures at the particulate filter 44 and other system parameters, such as air mass flow, EGR temperatures, and the like, so as to control regeneration. However, the present invention also contemplates that fuel may be included within the exhaust gases through other measures, such as by controlling the engine 14 to emit fuel with the exhaust gases.

The exhaust system may also include a Selective Catalyst Reducer (SCR) 11 to introduce a reductant, such as urea or ammonia, either hydrous or anhydrous, to a catalyst bed in the SCR to reduce NOx levels in the exhaust flow stream 23. Generally, the engine may include a NOx engine out sensor 13 and a NOx tail pipe out sensor 15 that are in electronic communication with the electronic controller and transmit data signal indicative of the level of NOx gas in the exhaust. The reductant is stored in a receptacle, such as tank 17, and is introduced into the SCR by at least one reductant injector 19. The reductant injector is in fluid communication 21 with the reductant tank and introduces reductant to the SCR when the received NOx sensor data is indicative of excess NOx levels in the exhaust gas stream.

An air intake system 52 may be included for delivering fresh air from a fresh air inlet 54 through an air passage to an intake manifold for introduction to the engine 14. In addition, the system 52 may include an air cooler or charge air cooler 56 to cool the fresh air after it is compressed by the compressor 34. Optionally, a throttle intake valve 58 may be provided to control the flow of fresh air to the engine 14. Optionally, the throttle intake valve 58 may also be provided to control the flow of EGR gases to the engine 14 or control both fresh air and EGR gases 64 to the engine 14. The throttle valve 58 may be a manually or electrically operated valve, such as one which is responsive to a pedal position of a throttle pedal operated by a driver of the vehicle. There are many variations possible for such an air intake system and the present invention is not intended to be limited to any particular arrangement. Rather, the present invention contemplates any number of features and devices for providing fresh air to the intake manifold and cylinders, including more or less of the foregoing features.

An exhaust gas recirculation (EGR) system 64 may be optionally provided to recycle exhaust gas to the engine 14 for mixture with the fresh air. The EGR system 64 may selectively introduce a metered portion of the exhaust gasses into the engine 14. The EGR system 64, for example, may dilute the incoming air charge and lower peak combustion temperatures to reduce the amount of oxides of nitrogen produced during combustion. The amount of exhaust gas to be recirculated may be controlled by controlling an EGR valve 66 and/or in combination with other features, such as the turbocharger. The EGR valve 66 may be a variable flow valve that is electronically controlled. There are many possible configurations for the controllable EGR valve 66 and embodiments of the present invention are not limited to any particular structure for the EGR valve 66.

The EGR system 64 in one non-limiting aspect of the present invention may include an EGR cooler passage 70, which includes an EGR cooler 72, and an EGR cooler bypass 74. The EGR valve 66 may be provided at the exhaust manifold to meter exhaust gas through one or both of the EGR cooler passage 70 and bypass 74. Of course, the present invention contemplates that the EGR system 64 may include more or less of these features and other features for recycling exhaust gas. Accordingly, the present invention is not intended to be limited to any one EGR system and contemplates the use of other such systems, including more or less of these features, such as an EGR system having only one of the EGR cooler passage or bypass.

A cooling system 80 may be included for cycling the engine 14 by cycling coolant there through. The coolant may be sufficient for fluidly conducting away heat generated by the engine 14, such as through a radiator. The radiator may include a number of fins through which the coolant flows to be cooled by air flow through an engine housing and/or generated by a radiator fan directed thereto as one skilled in the art will appreciated. It is contemplated, however, that the present invention may include more or less of these features in the cooling system 80 and the present invention is not intended to be limited to the exemplary cooling system described above.

The cooling system 80 may operate in conjunction with a heating system 84. The heating system 84 may include a heating core, a heating fan, and a heater valve. The heating core may receive heated coolant fluid from the engine 14 through the heater valve so that the heating fan, which may be electrically controllable by occupants in a passenger area or cab of a vehicle, may blow air warmed by the heating core to the passengers. For example, the heating fan may be controllable at various speeds to control an amount of warmed air blown past the heating core whereby the warmed air may then be distributed through a venting system to the occupants. Optionally, sensors and switches 86 may be included in the passenger area to control the heating demands of the occupants. The switches and sensors may include dial or digital switches for requesting heating and sensors for determining whether the requested heating demand was met. The present invention contemplates that more or less of these features may be included in the heating system and is not intended to be limited to the exemplary heating system described above.

A controller 92, such as an electronic control module or engine control module, may be included in the system 10 to control various operations of the engine 14 and other system or subsystems associated therewith, such as the sensors in the exhaust, EGR, and intake systems. Various sensors may be in electrical communication with the controller via input/output ports 94. The controller 92 may include a microprocessor unit (MPU) 98 in communication with various computer readable storage media via a data and control bus 100. The computer readable storage media may include any of a number of known devices which function as read only memory 102, random access memory 104, and non-volatile random access memory 106. A data, diagnostics, and programming input and output device 108 may also be selectively connected to the controller via a plug to exchange various information therebetween. The device 108 may be used to change values within the computer readable storage media, such as configuration settings, calibration variables, instructions for EGR, intake, and exhaust systems control and others.

The system 10 may include an injection mechanism 114 for controlling fuel and/or air injection for the cylinders 18. The injection mechanism 114 may be controlled by the controller 92 or other controller and comprise any number of features, including features for injecting fuel and/or air into a common-rail cylinder intake and a unit that injects fuel and/or air into each cylinder individually. For example, the injection mechanism 114 may separately and independently control the fuel and/or air injected into each cylinder such that each cylinder may be separately and independently controlled to receive varying amounts of fuel and/or air or no fuel and/or air at all. Of course, the present invention contemplates that the injection mechanism 114 may include more or less of these features and is not intended to be limited to the features described above.

The system 10 may include a valve mechanism 116 for controlling valve timing of the cylinders 18, such as to control air flow into and exhaust flow out of the cylinders 18. The valve mechanism 116 may be controlled by the controller 92 or other controller and comprise any number of features, including features for selectively and independently opening and closing cylinder intake and/or exhaust valves. For example, the valve mechanism 116 may independently control the exhaust valve timing of each cylinder such that the exhaust and/or intake valves may be independently opened and closed at controllable intervals, such as with a compression brake. Of course, the present invention contemplates that the valve mechanism may include more or less of these features and is not intended to be limited to the features described above.

In operation, the controller 92 receives signals from various engine/vehicle sensors and executes control logic embedded in hardware and/or software to control the system 10. The computer readable storage media may, for example, include instructions stored thereon that are executable by the controller 92 to perform methods of controlling all features and sub-systems in the system 10. The program instructions may be executed by the controller in the MPU 98 to control the various systems and subsystems of the engine and/or vehicle through the input/output ports 94. In general, the dashed lines shown in FIG. 1 illustrate the optional sensing and control communication between the controller and the various components in the powertrain system. Furthermore, it is appreciated that any number of sensors and features may be associated with each feature in the system for monitoring and controlling the operation thereof.

In one non-limiting aspect of the present invention, the controller 92 may be the DDEC controller available from Detroit Diesel Corporation, Detroit, Mich. Various other features of this controller are described in detail in a number of U.S. patents assigned to Detroit Diesel Corporation. Further, the controller may include any of a number of programming and processing techniques or strategies to control any feature in the system 10. Moreover, the present invention contemplates that the system may include more than one controller, such as separate controllers for controlling system or subsystems, including an exhaust system controller to control exhaust gas temperatures, mass flow rates, and other features associated therewith. In addition, these controllers may include other controllers besides the DDEC controller described above.

In accordance with one non-limiting aspect of the present invention, the controller 92 or other feature may be configured for permanently storing emission related fault codes in memory that is not accessible to unauthorized service tools.

Authorized service tools may be given access by a password and in the event access is given, a log is made of the event as well as whether any changes that are attempted to made to the stored fault codes. It is contemplated that any number of faults may be stored in permanent memory, and that preferably eight such faults are stored in memory.

Figure 2:
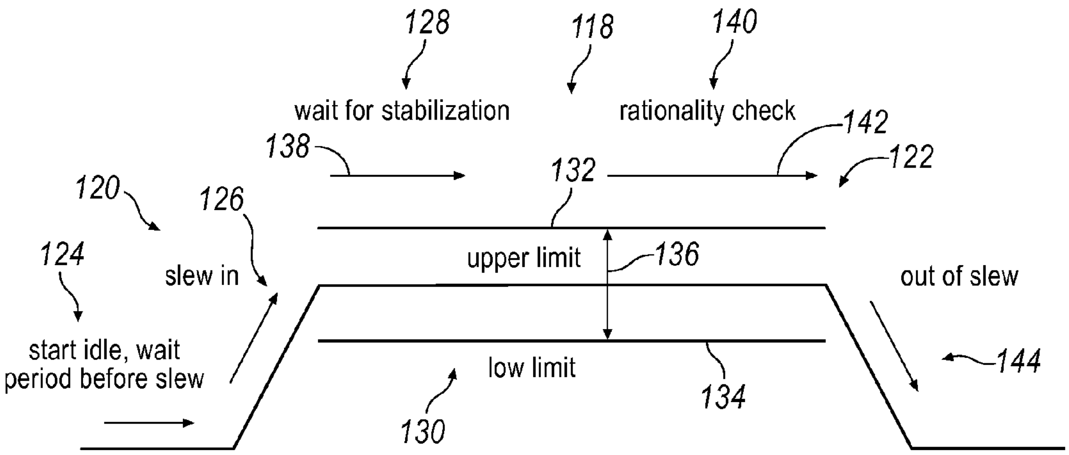
FIG. 2 is a schematic representation of the logic used to diagnose several systems and components by cycling the EGR Valve according to the present disclosure.

Having described an exemplary engine system, the discussion is now directed to various methods for operating the engine to diagnose engine systems and components. FIG. 2 is a schematic representation of the logic used in method 118 to diagnose several systems and components by cycling the EGR valve according to the present disclosure.

Specifically, the method may be said to comprise two parts. One part of the method is an intrusive slewing portion 120 and another portion may be termed a diagnostic monitor portion 122. Regarding the intrusive slewing portion, the method determines enabling and/or disabling criteria that are used to initiate or disable the method.

The intrusive slewing portion 120 of the method 118 may be configured to run once per OBD driving cycle or as often as desired by an operator or fleet manager. In an alternative embodiment, the method may be configured to run only in specific modes of operation such as, for example, during Normal Mode or standard mode of engine operation when the engine is in warm-up mode, during idle operation, during diesel particulate filter regenerations, during operator torque request mode or during any other mode of operation. Other enabling and/or disabling criteria include, but are not limited to monitoring engine conditions, such as monitoring minimum engine temperatures, such as minimum coolant temperature, minimum oil temperature and minimum intake manifold temperature. Other monitoring conditions can include minimum ambient temperature, maximum altitude/minimum barometric pressure, minimum battery voltage, maximum time after a DPF regeneration, or a minimum time wherein all monitoring conditions are true. It is also contemplated that the method may be limited to operation when the engine out NOx sensor active bit is set plus a calibratable, predetermined delay of time.

The intrusive slewing portion 120 of method 118 may be inhibited during specific modes of operation such as Normal Mode operation of the engine during warm up, idle operation, during Normal Mode of engine operation when the engine is in warm-up mode, during idle operation, during diesel particulate filter regenerations, during operator torque request mode or during any other mode of operation. In addition, the method 118 may be disabled when the vehicle speed is less than a predetermined minimum, calibratable threshold, or when fuel mass and engine speed are less than a predetermined calibritible minimum threshold.

It is also a feature of the method 118 disclosed herein that when any of the above enabling/disabling criteria are no longer valid, the method includes ramping up engine timing, i.e., Beginning of Injection (BOI), fuel rail pressure (in those engines using common rail fuel systems), EGR position, Intake Throttle Valve Position, and Injector Nozzle Opening Pressure, back to their normal values.

In intrusive slewing portion 120, the method includes determined whether the various operating conditions etc as set forth above are determined at 124. When it is determined that the specific mode of operation is occurring, the method determines whether to slew operation of the various components and/or systems to be diagnosed as at 126, and operate those components and/or systems for a time sufficient to determine whether they have stabilized in their operation, as seen at 128. As with any engine operating system or component, there is a range of measurements or determinants used to determine whether the system or component has stabilize. As seen at 130, there is an upper limit 132 and a lower limit 134 which constitute a range 136 within which the system or component may be said to be stabilized. The system or component should be operated for a time 138 sufficient to determine whether it has stabilized.

After it is determined that the system or component to be diagnosed has reached stable operation, fuel injection timing (BOI), fuel rail pressure (if a common rail fuel system is used) EGR valve position, intake throttle valve position and fuel injector nozzle opening pressure (NOP) ramp or are operated at predetermined calibratable values over a predetermined calibratable period to time Once all these operations have been completed, setpoints for the components or system to be diagnosed are slewed and the method is active for a rationality check 140 for a predetermined, calibratable period of time 142.

The rationality check 140, constitutes a portion of the diagnostic monitor portion 122. During the diagnostic monitor portion, it is preferred that the engine conditions to be diagnosed are monitored, such as monitoring minimum engine temperatures, minimum coolant temperature, minimum oil temperature and minimum intake manifold temperature. Other monitoring conditions can include minimum ambient temperature, maximum altitude/minimum barometric pressure, minimum battery voltage, maximum time after a DPF regeneration, or a minimum time wherein all monitoring conditions are true. In addition, the engine fuel mass may be below a maximum, calibritible, predetermined gradient to enable the diagnostic portion of the method. These The method then comprises determining a number of rationality checks of the various systems and components to determine whether a fault condition exists relative the system or component. For example, when the NOx sensor is checked for sensor drift, the engine out NOx is compared to a stable function of engine speed and fuel mass. The value may also take into account a correction factor such as, for example, a multiplier as a function of intake manifold pressure and intake manifold temperature. The NOx value should be within the predetermined calibratable range 136 to pass the rationality check. If the NOx value is outside this range, the method provides that a fault is set to indicate that the NOx sensor is out of specification.

The EGR valve may also be checked in a number of ways to ensure it is operating within specification. For example, in the event the EGR valve is to be checked, the EGR valve position may be verified by comparing the actual position of the valve with the commanded position of the valve. If the actual valve position is outside the range 136 of the component, a fault may be logged that the EGR valve is out of specification. In the event the EGR valve response time is to be checked, the time required to complete the valve response command is compared to a predetermined time value in memory. If the actual EGR valve response time is outside the range 136, a fault may be logged that the EGR valve response time is out of specification. In the event EGR differential pressure is to be checked, pressure sensor data for the EGR is checked against expected values in memory. If the pressure data is outside the range 136, a fault is set to alert the owner operator that the EGR differential pressure is out of specification.

Intake manifold temperature and charge air cooler outlet temperature rationality checks may also be conducted using the EGR. Depending upon the component to be tested, the EGR valve is monitored to determine at which temperature or temperature range it closes or opens. That temperature or temperature range is then compared to a temperature or temperature range in memory. If it has been determined that the EGR is operating within specification, if the temperature or temperature range is outside of range 136, the intake air temperature sensor or air cooler outlet temperature sensor is outside of specification and a fault is logged in memory. If it is determined that the temperature sensors are within operating specification, a fault may be logged indicating that the EGR is outside of specification.

Fueling Injection timing may also be checked by comparing various parametric data during fuel injection timing, such as, for example instantaneous engine speed, engine out NOx, inlet manifold temperature, engine boost among others. If any of these is outside of the range 136, a fault is logged in memory indicating that the Fuel injection timing is out of specification.

Once the systems or components selected for testing are checked for faults, they are taken out of slew as at 144 and the engine, systems and components are operated at a normal mode. In this regard, it can be appreciated that the BOI, fuel rail pressure (for systems using common rail fuel systems) EGR valve position, intake throttle valve position, and Nozzle Opening Pressure (NOP) are taken out of slew and ramped back to their normal values.

Figure 3:
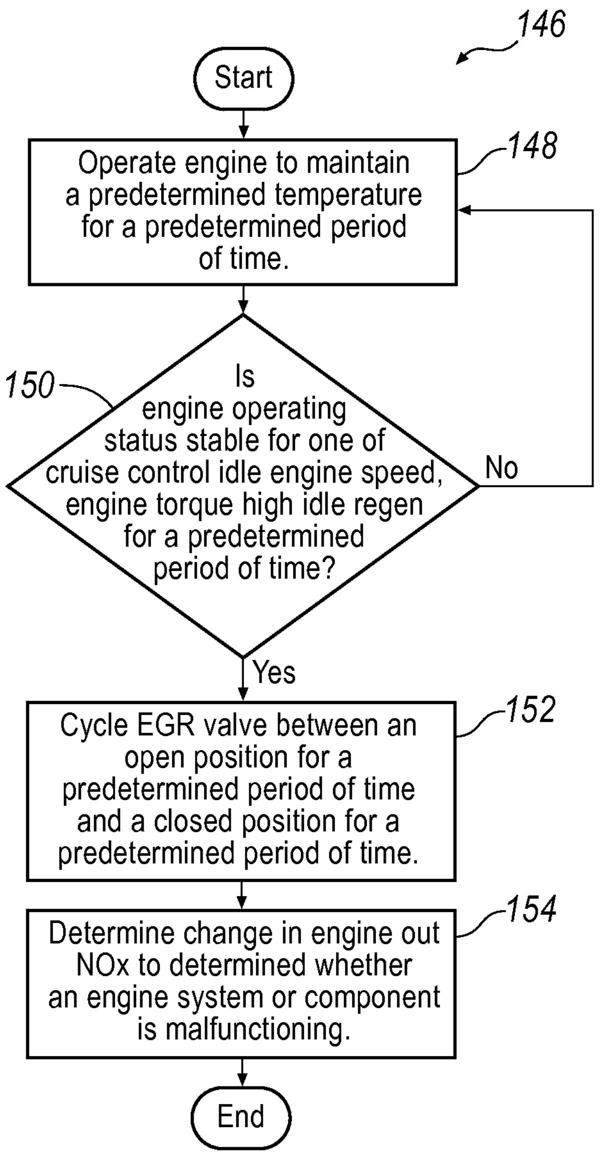
FIG. 3 is a schematic representation of a software flow chart of one method according to the present disclosure.

FIG. 3 is a representation of a method 146 according to one aspect of the present disclosure. Step 148 involves operating the engine to maintain a predetermined temperature for a predetermined period of time. The predetermined temperature and predetermined time may be programmable and are generally selected to provide an environment that permits normal operation and functioning of various engine and exhaust systems much as they would be expected to operate during operation of the vehicle in normal use. Once engine operating temperature has reached the predetermined temperature for a predetermined period of time, step 150 is determining whether the engine operating status is stable for any operating condition or system, and may include, but is not limited to one of cruise control, idle engine output, engine torque, manifold temperature, or high idle regeneration for a predetermined period of time, which time may be programmable. If none of these systems are determined to be stable for the predetermined period of time, the method loops back to step 148 and the engine operates until the engine is found to be operating in a predetermined temperature for a predetermined period of time. If the determination in step 150 is yes, at least one of the engine operating parameters is stable for a predetermined period of time, step 152 is cycling the EGR valve between a first position, such as an open position, for a predetermined period of time and a second position, such as closed position, for a predetermined period of time. In this step, it is not important whether the EGR valve starts from an open position or from a closed position, or that it is cycled from a closed position for a predetermined period of time to an open position for a predetermined period of time. Rather, it is only necessary the EGR valve is cycled from one of those positions for a predetermined period of time and then from the other position for a predetermined period of time.

After the passage of the predetermined periods of time as set forth in step 152, step 154 is determining the change in engine out NOx ($\Delta$Nox). This is accomplished by NOx sensors in the engine out portion before the exhaust out portion of the exhaust system transmitting data signals indicative of $\Delta$NOx to the Engine Control Unit in order to determine whether an engine system or component is malfunctioning. When the EGR valve is closed, it is expected that NOx levels will be increased, and when the EGR valve is opened, it is expected that NOx levels will be decreased. If indeed the NOx measurements increase on both the engine out and the tail pipe out when the EGR valve is opened and decrease when the EGR valve is closed again, and if the difference between the engine out NOx levels and the tailpipe out NOx levels is within an expected, predetermined region within a predetermined period of time, it can be determined that both NOx sensors are functioning appropriately. Moreover, the NOx efficiency of the aftertreatment system, the NOx reductant injection performance, the NOx reductant levels, whether the reductant is proper or improper, whether the EGR system response is satisfactory, and the EGR low flow and high flow rates can also be determined. In addition, it can be determined whether the EGR valve command is satisfactory, by monitoring the actual EGR valve position and comparing it to the commanded EGR valve position, it is possible to determine whether the EGR change of pressure ($\Delta$Pressure) sensor is within operational specification, determine whether the NOx Engine out sensor is operational and within specification, determine whether the NOx tail pipe out sensor is operational and within specification, and determine whether the reductant injection is operational and within specification.

It is further contemplated that the methods as described may be conducted during every drive cycle to ensure acceptable monitor performance ratios. In conducting the methods as described during any drive cycle, it is important to account for the impact on emissions of overriding the EGR control system for appropriate emission test cycles. In addition, cycling the EGR valve during every drive cycle may be noticeable to a vehicle operator and should be conducted in such as way as to not become a nuisance to the operator.

It is also contemplated to utilize the described methods as a sequential monitor. In this mode, the method occurs only if a more general fault is first detected by the electronic controller. In such an event, the diagnostic could be run on board prior to the vehicle arriving at a major repair facility and thereby provide more specific fault information to the service technician. For example, if a NOx conversion efficiency malfunction is detected, the method can be run to more completely isolate the fault. In another example, if the EGR valve is closed and both NOx sensors indicate an increase in NOx emissions proportionately, it would indicate that the NOx sensors are within operational specification and the reason for the low efficiency must be in the Selective Catalyst Reductant (SCR) System and not with the NOx sensors. Conversely, if the EGR valve is closed, both NOx sensors should decrease proportionately to indicate that both the EGR and the NOx sensors are functioning within operational specification.

Further, the method as described is useful in determining whether NOx sensors values are part of a failure determination. With recent technological advances, manufacturers are installing sensors that measure the NOx emissions that are output from the engine and the tailpipe. Although it is difficult to correlate instantaneous NOx readings to a weighted average over an emissions test cycle, it is beneficial to use that information when determining whether or not a malfunction is present. One way to accomplish this to measure the NOx emission value and compare it to a predetermined NOx emission value in memory. When a sensor malfunction is present, NOx emissions should increase. If the NOx emissions value is above a predetermined threshold, a malfunction in the sensor is indicated. If the NOx emission value is below a predetermined threshold, it is determined that no NOx sensor malfunction exists.

The words used in this disclosure are words of description and not words of limitation. Those skilled in the art will recognize that many variations and modifications are apparent and can be made without departing from the scope and spirit of the invention as set forth in the appended claims.

What is claimed as new and desired to be protected by Letters Patent of the United States is:

1. A method to operate an electronic controlled internal combustion engine having an electronic controller with memory and equipped with an Exhaust Gas Recirculation (EGR) system, said engine connectable with an exhaust after-treatment system, comprising:

a) operating said engine to maintain a predetermined operating status for a predetermined period of time;

b) determining whether said engine operating status is stable for at least one engine operating parameter for a predetermined period of time;

c) cycling said EGR system valve between a first position for a predetermined period of time and a second position for a predetermined period of time; and d) determining a change in said engine operating parameter to determine whether an engine component or system is malfunctioning;

wherein NOx emission values from NOx sensors are compared and if engine out NOx and exhaust out NOx increase when the EGR valve is open and decrease when the EGR valve is closed and engine out NOx and exhaust out NOx differ by a predetermined amount within a predetermined period of time, said NOx sensors are within operating specifications.

2. The method of claim 1, further including operating the engine until an operational status of at least one engine operating parameter is stable for a predetermined period of time when it is determined that engine operating status in step (b) is not stable.

3. The method of claim 1, wherein said engine operating parameter may be by least one of cruise control, EGR flow, intake manifold temperature, EGR differential pressure, idle engine speed (RPM), engine torque (ETQ) engine out NOx, exhaust out NOx, or high idle regeneration.

4. The method of claim 1, wherein said EGR valve first position is an open position and said EGR valve second position is a closed position.

5. The method of claim 1, wherein said EGR valve first position is a closed position and said EGR valve second position is an open position.

6. The method of claim 1, further including determining whether NOx emissions exceed a predetermined level and overriding EGR control.

7. The method of claim 1, wherein if the EGR valve is closed and at least two NOx sensors indicate an increase in NOx emissions proportionately, said NOx sensors are within operational specification.

8. The method of claim 1, wherein NOx emission values from NOx sensors are compared to a weighted average over an emissions test cycle, to determine whether or not a sensor is malfunctioning.

9. The method of claim 8, wherein said malfunction is determined by measuring the NOx emission value and comparing it to a predetermined NOx emission value in memory.

10. The method of claim 9, wherein when said NOx emissions value is above a predetermined threshold, a malfunction in a NOx sensor is indicated.

11. The method of claim 8, wherein when the NOx emission value is below a predetermined threshold, it may be determined that no NOx sensor malfunction exists.

12. A controller for intrusive diagnostic testing configured to:

a) operate an engine to maintain a predetermined temperature for a predetermined period of time;

b) determine engine operating status for at least one engine operating parameter for a predetermined period of time;

c) cycle an EGR valve between a first position for a predetermined period of time and a second position for a predetermined period of time; and d) determine a change in at least one of engine out NOx and exhaust out NOx to determine whether a NOx reductant system malfunctions.

13. A method to operate an electronic controlled internal combustion engine having an electronic controller with memory and equipped with an Exhaust Gas Recirculation (EGR) system, said engine connectable with an exhaust after-treatment system, comprising:

a) operating said engine to maintain a predetermined operating status for a predetermined period of time;

b) determining whether said engine operating status is stable for at least one engine operating parameter for a predetermined period of time;

c) cycling said EGR system valve between a first position for a predetermined period of time and a second position for a predetermined period of time; and d) determining a change in said engine operating parameter to determine whether an engine component or system is malfunctioning;

wherein NOx emission values are compared and if engine out NOx and exhaust out NOx increase when the EGR valve is open and decrease when the EGR valve is closed and engine out NOx and exhaust out NOx differ by a predetermined amount within a predetermined period of time, a NOx reductant system is within operating specifications.

14. The method of claim 13, further including operating the engine until an operational status of at least one engine operating parameter is stable for a predetermined period of time when it is determined that engine operating status in step (b) is not stable.

15. The method of claim 13, wherein said engine operating parameter may be by least one of cruise control, EGR flow, intake manifold temperature, EGR differential pressure, idle engine speed (RPM), engine torque (ETQ) engine out NOx, exhaust out NOx, or high idle regeneration.

16. The method of claim 13, wherein said EGR valve first position is an open position and said EGR valve second position is a closed position.

17. The method of claim 13, wherein said EGR valve first position is a closed position and said EGR valve second position is an open position.

18. The method of claim 13, further including determining whether NOx emissions exceed a predetermined level and overriding EGR control.

19. The method of claim 13, wherein if the EGR valve is closed and at least two NOx sensors indicate an increase in NOx emissions proportionately, said NOx sensors are within operational specification.

20. The method of claim 13, wherein NOx emission values from NOx sensors are compared to a weighted average over an emissions test cycle, to determine whether or not a sensor is malfunctioning.

21. The method of claim 20, wherein said malfunction is determined by measuring the NOx emission value and comparing it to a predetermined NOx emission value in memory.

22. The method of claim 21, wherein when said NOx emissions value is above a predetermined threshold, a malfunction in a NOx sensor is indicated.

23. The method of claim 20, wherein when the NOx emission value is below a predetermined threshold, it may be determined that no NOx sensor malfunction exists.

* * * * *